US007734183B2

(12) United States Patent
Whitehead

(10) Patent No.: US 7,734,183 B2
(45) Date of Patent: Jun. 8, 2010

(54) XFI-XAUI INTEGRATED CIRCUIT FOR USE WITH 10GBASE-LX4 OPTICAL TRANSCEIVERS

(75) Inventor: Thomas Whitehead, Chicago, IL (US)

(73) Assignee: Emcore Corporation, Albuquerque, NM (US)

( * ) Notice: Subject to any disclaimer, the term of this patent is extended or adjusted under 35 U.S.C. 154(b) by 522 days.

(21) Appl. No.: 11/510,155

(22) Filed: Aug. 25, 2006

(65) Prior Publication Data

US 2008/0049780 A1    Feb. 28, 2008

(51) Int. Cl.
*H04L 12/26* (2006.01)
(52) U.S. Cl. .................. 398/135; 398/138; 398/140; 398/164; 370/463
(58) Field of Classification Search ........... 398/135, 398/138, 139, 164
See application file for complete search history.

(56) References Cited

U.S. PATENT DOCUMENTS

| 4,747,041 | A * | 5/1988 | Engel et al. ............. 713/324 |
| 6,914,545 | B1 * | 7/2005 | Zaidi ....................... 341/59 |
| 2003/0067360 | A1 * | 4/2003 | Takada ................. 331/107 SL |
| 2003/0095564 | A1 * | 5/2003 | Feuerstraeter et al. ....... 370/445 |
| 2003/0149903 | A1 * | 8/2003 | Chang ........................ 713/300 |
| 2004/0008996 | A1 * | 1/2004 | Aronson et al. ............ 398/202 |
| 2004/0081145 | A1 * | 4/2004 | Harrekilde-Petersen et al. .......................... 370/362 |
| 2004/0153726 | A1 * | 8/2004 | Suzuki ......................... 714/6 |
| 2005/0111845 | A1 * | 5/2005 | Nelson et al. .............. 398/138 |
| 2006/0008041 | A1 * | 1/2006 | Kim et al. ................. 375/371 |
| 2006/0216958 | A1 * | 9/2006 | Yee et al. ..................... 439/66 |

OTHER PUBLICATIONS

"10GBASE-LX4 Pushes Multimode Fiber Limits", by Amir Bar-Niv, Dimitry Taich, John Dallesasse, Reginald Ball, Paul Wachtel, Tome Whitehead; CommsDesign and EE Times Community; Aug. 17, 2006.*

* cited by examiner

*Primary Examiner*—Ken N Vanderpuye
*Assistant Examiner*—Tanya Ngo

(57) ABSTRACT

A single chip integrated circuit for use in an optical transceiver for converting and coupling an information containing electrical signal with an optical fiber having an XFI interface for coupling with an external electrical cable or information system device, and an XAUI interface for coupling with a laser transmitter subassembly including first, second, third and fourth lasers operating at different wavelengths and modulated by the respective four lane XAUI signals. The circuit includes an encoder for encoding the incoming XFI signal into four signals in the XAIU format, and a decoder coupled to the XAUI interface for receiving a four lane XAUI signal and converting it into a serial XFI signal coupled to the XFI interface.

11 Claims, 3 Drawing Sheets

XFI-XAUI INTEGRATED CIRCUIT FOR USE WITH 10GBASE-LX4 OPTICAL TRANSCEIVERS

REFERENCE TO RELATED APPLICATIONS

This application is related to co-pending U.S. patent application Ser. No. 10/866,265 filed Jun. 14, 2004, assigned to the common assignee.

This application is related to U.S. patent application Ser. No. 11/510,157, now issued as U.S. Pat. No. 7,325,983, and entitled 10 GBASE-LX4Optical Transceiver in XFP Package filed simultaneously herewith and assigned to the common assignee.

BACKGROUND OF THE INVENTION

1. Field of the Invention

The invention relates to integrated circuits for use in optical transceivers, and in particular to Ethernet (IEEE 802.3ae standard) compliant transceivers that provide a 10 Gigabit per second communications link between computers or communications units over optical fibers, such as used in high throughput fiber optic communications links in local and wide area networks and storage networks.

2. Description of the Related Art

A variety of optical transceivers are known in the art which include an optical transmit portion that converts an electrical signal into a modulated light beam that is coupled to a first optical fiber, and a receive portion that receives a second optical signal from a second optical fiber and converts it into an electrical signal.

Optical transceivers are packaged in a number of standard form factors which are "hot pluggable" into the chassis of the communications data system unit. Standard form factors provide standardized dimensions and electrical input/output interfaces that allow devices from different manufacturers to be used interchangeably. Some of the most popular form factors include XENPAK (see www.xenpak.org), X2 (see www.X2 msa.org), SFF ("small form factor"), SFP ("small form factor pluggable"), and XFP ("10 Gigabit Small Form Factor Pluggable", see www.XFPMSA.org).

Although these conventional pluggable designs have been used successfully in the past for low data rate protocol, challenge miniaturization for which is an ever-constant objective in the industry. It is desirable to miniaturize the size of transceivers in order permit greater port density associated with the electrical network connection, such as, for example, the input/output ports of switch boxes, cabling patch panels, wiring closets, and computer I/O interfaces.

The XFP module is a hot-pluggable, serial-to-serial optical transceiver that supports SONET OC-192, 10 Gigabit Ethernet, 10-Gbit/s Fiber Channel, and G.709 links. The module is 78 mm in length, 18.4 mm in width, and 8.5 mm in height. This small size limits the amount of electrical circuitry that can be implemented in the package, and consequentially in the prior art the majority of electronic signal processing is located in devices on the host board (inside the computer or network unit) rather than within the module in current commercial XFP devices. The XFP form factor features a serial 10 Gbit/s electrical interface called XFI that assumes that the majority of electronic signal processing functions are located within the circuits or ASICs on the system printed circuit board rather than within the optical transceiver module. Since the electronic processing defines the communication protocol, the XFP module is protocol independent.

The XFI interface is a differentially signaled, serial interconnect with nominal baud rate between 9.95 and 10.75 Gbit/s. Transmit and receive signals are AC coupled, 100-ohm differential pairs. The electrical interconnect may include combinations of microstrip and/or stripline traces on the printed circuit board up to 12 in. (300 mm) in length, layer-to-layer via structures, a 30-pin connector, and a BGA ASIC package.

One of the most important optical communications protocols is the 10 Gigabit per second Ethernet standard (GbE) is particularly suited for this technology.

10 Gigabit Ethernet standard specifications are set forth in the IEEE 802.3ae supplement to the IEEE 802.3 Ethernet standard. The supplement extends the 802.3 protocol and MAC specification to an operating speed of 10 Gb/s. Several Physical Coding Sublayers known as 10 GBASE-X, 10 GBASE-R and 10-GBASE-W are specified, as well as a 10 Gigabit Media Independent Interface (XGMII), a 10 Gigabit Attachment Unit Interface (XAUI) a 10 Gigabit Sixteen-Bit Interface (XSBI) and management.

The 10 GBASE-LX4 media type uses wave division multiplexing technology to send signals over four wavelengths of light carried over a single pair of fiber optic cables. The use of course wavelength division multiplexing (CWDM) allows four optically multiplexed channels each transmitting a 3.125 Gb/sec signal over a single fiber pair (i.e. utilizing one fiber for each direction), as set forth in IEEE 802.3ae Clause 53, setting forth the 10 GBASE-LX4 Physical Media Dependent (PMD) sublayer. An optical transceiver designed for operating in conformance with such protocol is described in U.S. patent Ser. No. 10/866,265, herein incorporated by reference. The 10 GBASE-LX4 system is designed to operate at 1310 nm over multi-mode or single-mode dark fiber. The design goal for this media system is from two meters up to 300 meters over multimode fiber or from two meters up to 10 kilometers over single-mode fiber, with longer distances possible depending on cable type and signal quality requirements.

WDM high date rate applications have found widespread application in short reach Ethernet networks. Ethernet (the IEEE 802.3 standard) is the most popular data link network protocol. The Gigabit Ethernet Standard (IEEE 802.3) was released in 1998 and included both optical fiber and twisted pair cable implementations. The 10 GB/sec Ethernet standard (IEEE 802.3 ae) was released in 2002 with both optical fiber and twisted pair cabling. The difficulties associated with multi-gigabit signaling over existing wiring has limited the applications for such cabling, although efforts are currently underway for new copper cabling standards.

Among the many features defined in the 10 Gigabit Ethernet draft standard is the XAUI (pronounced "Zowie") interface. The "AUI" portion of the acronym is borrowed from the Ethernet Attachment Unit Interface. The "X" in the acronym represents the Roman numeral for ten and implies the interface is ten gigabits per second. The XAUI interface is a low pin count, self-clocked serial bus designed as an Interface extender for the 74 signal wide interface (32-bit data paths for each of transmit and received) XGMII. The XAUI may be used in place of, or to extend, the XGMII in chip-to-chip applications typical of most Ethernet MAC to PHY interconnects In the transmit direction, the MAC parallel electrical interface (XAUI) is monitored and retimed by the physical layer device (PHY). The XAUI bus is a four lane, 8b/10b encoded, 3.125 Gb/s CML electrical signal. Much like scrambling in traditional SONET systems, 8b/10b encoding ensures DC-balance (the average number of logic ones is equal to the average number of logic zeros) and a minimum transition density simplifying the optical architecture. The retimed XAUI bus modulates an optical transmitter array, generating four optical Non-Return-to-Zero (NRZ) waveforms. Each optical transmitter operates at a different wavelength, near 1310 nm with 24.5 nm center spacing and 13 nm tolerance. The optical signals are wavelength division multiplexed for transmission over a single fiber.

In the received direction, the CWDM signal is optically demultiplexed into its four constituent wavelengths. A quad receiver array converts the demultiplexed optical signals into four 3.125 Gb/s electrical signals. The PHY device performs clock recovery on each data lane, retimes the signal, and monitors the network interface performance. The retimed XAUI interface is then transmitted to the MAC device.

The fact that 10 GBASE-LX4 is simply an optical extension of the XAUI interface often calls into question whether or not the PHY device is always required. In fact, IEEE 802.3ae does not explicitly define a requirement for the PHY device and remains intentionally vague on the implementation details. However, the PHY device performs two very important tasks, which cannot be easily addressed in its absence.

First, the XAUI interface was originally defined to extend the system reach between layer 2 and layer 1 devices while simultaneously reducing the pin count requirements of small form factor pluggable modules. This interface is loosely defined to support 50 cm (twenty inches) of FR-4 material. In a typical 10 GBASE-LX4 module-based implementation, the XAUI interface would be subject to transmission distances on the order of 10 cm (4") on each of four independent substrates, plus two connector interfaces. With additional penalties due to the electrical-to-optical and optical-to-electrical conversion combined with impairments introduced by the transmission media, XAUI amplitude and phase noise limits will likely be exceeded. Highly integrated PHYs, such as the Quake Technologies (QT2044, provide full 3R (recover, retime, reshape) regeneration with compliance to the IEEE 802.3ae 10 GBASE-LX4 and XAUI specifications.

Secondly, the 10 GBASE-LX4 standard also requires conformance to the XGXS and PCS/PMA physical layer clauses, which contain an extensive set of registers for provisioning and performance monitoring. The majority of these registers is associated with XAUI performance and is best handled within a high-speed PHY device. In addition, PHY devices specifically designed for 10 GBASE-LX4 applications, such as the QT2044, integrate management for the pluggable module non-volatile memory space and Diagnostic Optical Monitoring (DOM) devices defined within the XENPAK, XPAK, and X2 Multi-Source Agreements.

The electrical input to the optical transceiver is a serial 10 Gbit/sec XFI interface. In order to produce a 10 GBASE-LX4 optical signal, the electrical input must be converted into a four lane XAUI signal, with each lane applied to and modulating a different laser.

Although single chip integrated circuits such as the Puma AEL1002 are commercially available, such chips are designed for implementation on the host side, and convert four lanes of 3.125 Gbps/XAUI data signals from the host into a 10 Gbps XFI data signal which is applied to the XFP module, as shown in FIG. 1. Since the optical signal being transmitted by such existing modules is a serial 10 Gbps signal, there has been no need for an XFI to XAUI data signal conversion.

Prior to the present invention, there has not been a suitable integrated circuit for use in a transceiver for high speed (10 Gigabits/sec. or more) optical transmission in a very small (XFP type) form factor.

SUMMARY OF THE INVENTION

1. Objects of the Invention

It is an object of the present invention to provide an integrated circuit for use in a high speed optical transceiver using a serial electrical interface.

It is also another object of the present invention to provide an integrated circuit for use in an XFP form factor for use in an optical fiber transmission system with an industry standard 10 G BASE-LX4 physical layer and using an XFI electrical interface.

It is still another object of the present invention to provide an integrated circuit for an optical transceiver for use in an optical wavelength division multiplexed (WDM) transmission system suitable for short range and long haul applications using multiple semiconductor lasers.

2. Features of the Invention

Briefly, and in general terms, the present invention provides a single chip integrated circuit for use in an optical transceiver for converting and coupling an information-containing electrical signal with an optical fiber including an XFI interface for coupling with an external electrical cable or information system device for receiving and transmitting a serial electrical signal, an encoder for encoding the serial electrical signal into a four lane XAUI format, a decoder for decoding an incoming four lane XAUI signal into a serial electrical signal.

Additional objects, advantages, and novel features of the present invention will become apparent to those skill in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications modifications and embodiments in other fields, which are within the scope of the invention as disclosed and claimed herein and with respect to which the invention could be of utility.

BRIEF DESCRIPTION OF THE DRAWINGS

These and other features and advantages of this invention will be better understood and more fully appreciated by reference to the following detailed description when considered in conjunction with the accompanying drawings, wherein.

Figure 1:
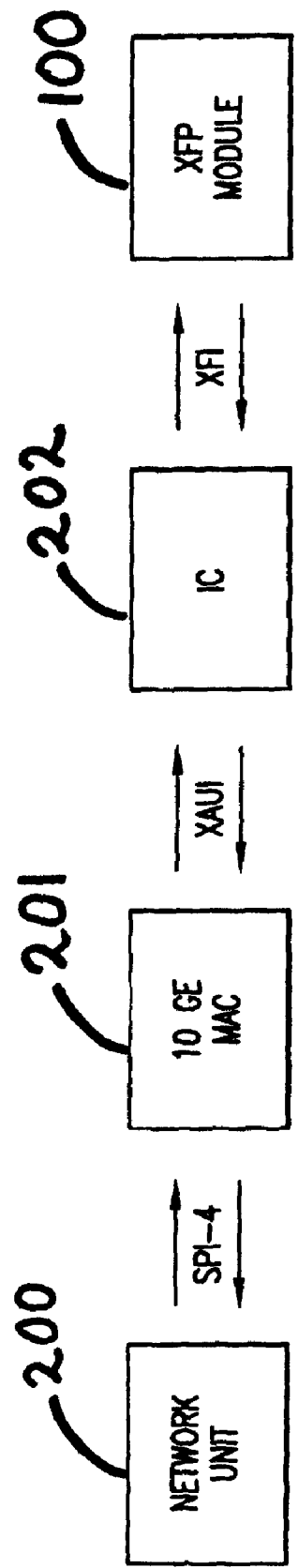
FIG. 1 is a block diagram showing the electrical signal interfaces between a network unit and the XFP module as known in the prior art.

The novel features and characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF THE PREFERRED EMBODIMENT

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments or the relative dimensions of the depicted elements, and are not drawn to scale.

FIG. 1 is a block diagram showing the electrical signal interfaces between a network unit and the XFP module as known in the prior art. The network unit 200 is connected to a 10 Gigabit Ethernet (GE) media access controller (MAC) 201. The interface between the network unit 200 and the MAC 201 is typically a System Packet Interface Level 4 (SPI-4) defined by the Optical Internetworking Form Implementation Agreement OIF-SPO4-02.1 (see www.oiforum.com). In particular, SPI-4 is an interface for packet and cell transfer between a physical layer (PHY) device and a link layer device, for aggregate bandwidths of OC-192 ATM and Packet over SONET/SDH(POS), as well as 10 Gb/s Ethernet applications.

Since the MAC electrical interface on the optical side is XAUI, and the XFP module 100 utilizes an XFI interface, an integrated circuit 202 is utilized to convert from XAUI to XFI. The XFI side of the IC 202 is then interfaced with the XFP module 100.

Figure 2:
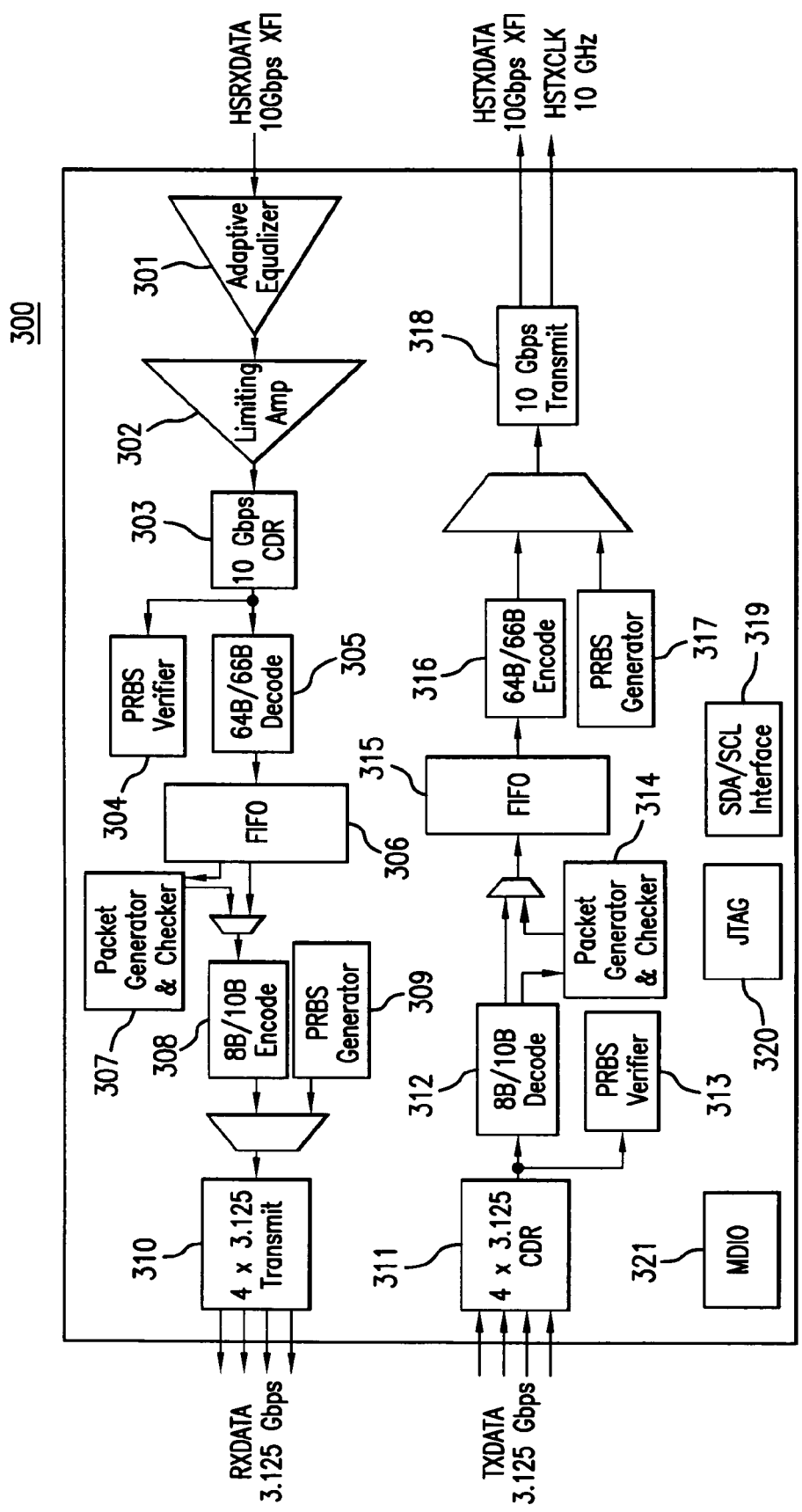
FIG. 2 is a block diagram of an XFI/XAUI integrated circuit according to the prior art.

FIG. 2 is a block diagram of an XFI/XAUI integrated circuit according to the prior art. The receive path block 301 accepts a 10 Gb/s XFI signal from an XFP module. The receiver contains an adaptive equalizer to further improve signal integrity of the XFI signal. The signal is converted into a digital signal by the limiting amplifier in block 302. The 10 Gb/s clock is extracted from the XFI signal by the clock and data recovery (CDR) circuit 303. The 64B/66B decoder 305 converts the 66 bit codes of the XFI interface into 64 bit codes. The PRBS (Pseudo Random Bit Sequence) verify block 304 is part of an internal test function that checks device functionality by sending and then comparing received PRBS traffic. The data from the 64B/66B decoder is loaded into a FIFO buffer 306 to compensate for clock differences between the time domains of the XFP module and the MAC. The 8B/10B encoder 308 ensures that there are sufficient transitions present in the 3.125 Gb/s XAUI stream for proper clock recovery. Blocks 307 and 309 are part of the PRBS test circuitry as described above. After processing, the data is parallelized into four 3.125 Gb/s XAUI lanes in block 310 and sent to the MAC. The transmit path block 311 accepts four 3.125 Gb/s XAUI data lanes from the MAC. The 8B/10B decoder 312 converts the 10 bit codes of the XAUI interface into 8 bit codes. This block also performs running disparity checks and illegal code checks to determine if valid XAUI data is present. Blocks 313, 314, and 317 are part of the PRBS test circuitry as described above. The data is then loaded into a FIFO buffer 315 to deskew the data and compensate for clock differences between the time domains of the MAC and the XFP module. The 64B/66B encoder 316 ensures that there are sufficient transitions present in the 10 Gb/s serial stream for proper clock recovery. After processing, the data is serialized into a 10.3125 Gb/s XFI interface in block 318 and transmitted to the XFP module. The MAC via the MDIO interface in block 321 controls the device. The device communicates with the XFP module via the I²C interface in block 319.

Figure 3:
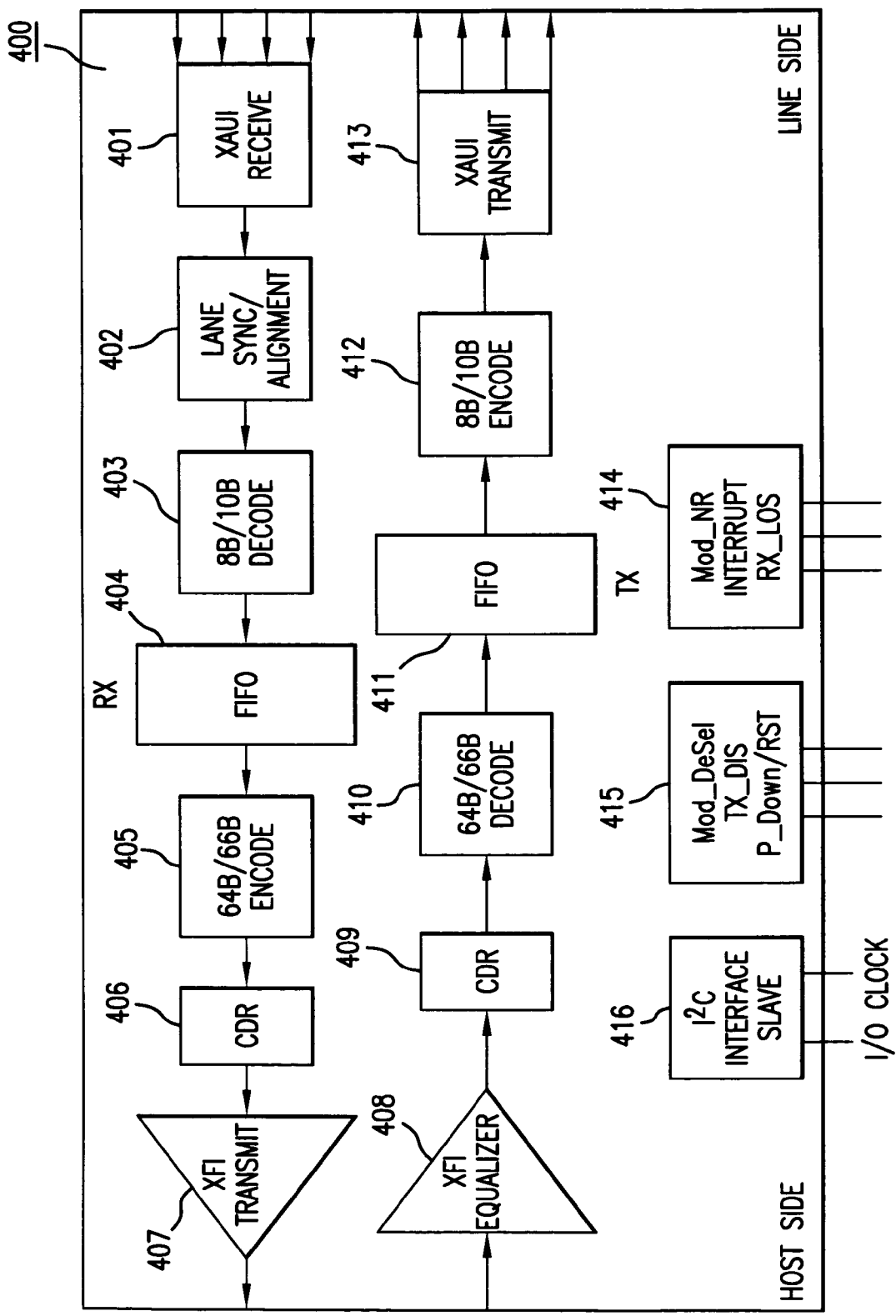
FIG. 3 is a block diagram of the XFI/XAUI conversion integrated circuit according to the present invention.

FIG. 3 depicts an XFI/XAUI integrated circuit 400 according to the present invention. The receive path block 401 accepts four XAUI lanes at 3.125 Gb/s from the line side that have been converted from optical to electrical signals by the receiver. Each XAUI receiver has a clock and data recovery (CDR) circuit 402 to extract the 3.125 Gb/s clock from the data. Block 402 also realigns the XAUI data to compensate for path length differences created by signals of different wavelengths propagating through the optical fiber. At multiple points throughout the receive path the data may be converted from serial to parallel data such as XGMIJ or XSBI for efficient processing of data. The 8B/10B decoder 403 converts the 10 bit codes of the XAUI interface into 8 bit codes. This block also performs running disparity checks and illegal code checks to determine if valid XAUI data is present. The data is then loaded into a FIFO buffer 404 to deskew the data and compensate for clock differences between the time domains of the line and the host. The 64B/66B encoder 405 ensures that there are sufficient transitions present in the 10 Gb/s serial stream for proper clock recovery. After processing, the data is serialized into a 10.3125 Gb/s XFI interface in block 406. This data is transmitted to the host via the XFI transmit circuitry found in block 407. The transmit path block 408 accepts a 10.3125 Gb/s serial XFI data stream from the host side. A CDR circuit 409 extracts the 10.3125 Gb/s clock from the data. In order to process the data it is deserialized by a serial-to-parallel converter. The 64B/66B decoder 410 converts the 66 bit codes of the XFI interface into 64 bit codes. The data is then loaded into a FIFO buffer 411 to compensate for clock differences between the time domains of the host and the line. The 8B/10B encoder 412 ensures that there are sufficient transitions present in the 3.125 Gb/s XAUI stream for proper clock recovery. After processing, the data is parallelized into four 3.125 Gb/s XAUI lanes in block 413. This data is sent to the transmitter for electrical to optical conversion. The XFI/XAUI integrated circuit 400 also includes Mod_NR Interrupt RX_LOS 414, Mod_DeSel TX_DIS P_Down/RST 415, and I²C Interface Slave 416.

Architecturally the device 400 is similar to an XFI-XAUI Bridge found on host systems. However, for the XFP-LX4 application the traffic passes through the device in reverse. That is, the device recovers an XFI signal from the host and converts it into four lanes of XAUI data on the transmit side. On the receive side the device recovers the four XAUI lanes, aligns the data, and converts it into an XFI signal. Management of the device is performed with an I²C interface. However, unlike an XFI-XAUI Bridge, this device must act as an I²C slave. Also, since this device is located within the XFP module it must perform additional status reporting functionality to be compliant with the XFP MSA. The XFI ("Ziffy") interface is defined in the XFP MSA as a high-speed serial electrical interface with a nominal baudrate of 9.95-11.1 Gb/s. The electrical interface is based on high speed low voltage AC coupled logic with a nominal differential impedance of 100 ohms. It is designed to support SONET OC-192, IEEE Std-802.3ae, 10 GFC and G.709 (OUT-2) applications. For the purposes of the XFP-LX4 module the XFI interface should at a minimum support IEEE.Std-802.3ae 10 Gigabit Ethernet at 10.3125 Gb/s. The XFI channel should be compliant to the Datacom jitter and differential output masks defined in the XFP MSA standard.

Ideally, the XFI-XAUI device should be able to derive its timing from a +/−100 PPM Baudrate/64 clock signal provided by the host system. If the host does not provide this optional clock, then a crystal oscillator will be placed in the module.

In addition to the XFI interface, and the XAUI interface, the XFI-XAUI device has the following hardware pins for control and status:
MOD_DeSel
TX_DIS
MOD_NR
Interrupt
RX-LOS A description of these control pins, and other features, follows.

MOD_DeSel

The MOD-DeSel is an input pin. When held low by the host, the module responds to 2-wire serial communication commands. When the pin is pulled high the device shall not respond to or acknowledge any 2-wire interface communication.

TX-DIS

TX-DIS is an input pin. When TX_DIS is asserted High, the XFP module transmitter output must be turned off. Ideally, the device would also have four TX-DIS output pins that would connect to the individual laser drivers in the module.

P_Down/RST

This is a multifunction pin for module Power Down and Reset. When held High the module shall be placed in Low Power mode with all functionally disabled except for 12C communication, laser safety features, and variable power supply functions. The negative edge of P_Down/RST signal initiates a complete module reset.

MOD_NR

The MOD-NR is an output pin that when High indicates that the module has detected a condition that renders transmitter and/or receiver data invalid. It shall consist of the logical OR of Transmitter LOL, Transmitter Laser Fault, and Receiver LOL.

Interrupt

Interrupt is an output pin. It should be pulled Low to indicate possible module operational fault or a status critical to the host system. The logic for this pin is defined in section 5.11 of the XFP MSA standard.

RX_LOS

RX_LOS is an output pin. It should be pulled High to indicate insufficient optical power for reliable signal reception. Ideally, the device should also have four RX-LOS input pins to connect to the digital status signals provided by the optical receiver.

Management Interface

The I²C interface of the device shall be implemented according to the 2-wire interface specification described in Chapter 4 of the XFP MSA. The serial interface uses a clock and a bidirectional data line to transmit data to and from the host. The address of the device shall be 0xa0. The device shall mirror the contents of an EEPROM to report vendor specific information. The memory map should be set up according to Chapter 5 of the XFP MSA. The internal I²C bus used to communication with the NVRAM should also be able to provide I²C communication to digital potentiometers or laser controllers.

Digital Optical Monitoring (DOM)

The XFP standard was created for single channel devices. Therefore, all DOM registers shall be populated based on a fixed representative channel. The data shall be mirrored from a DOM device inside the module with an address specified in the Vendor Specific register space. The parameters measured shall be transceiver temperature, TX bias current, TX output power, received optical power, and VCC2 voltage.

Variable Power Supply (VPS)

The "Bypassed Regulator Mode" option in section 5.7 of the XFP MSA standard is preferred for the XFP-LX4. The XFI-XAUI device must contain the necessary logic to enable this function, which may include a digital output hardware pin.

Loopback Modes

At a minimum the XFI-XAUI device shall implement the following loopback modes:
XFI loopback
XAUI loopback
Analog XAUI loopback Section 5.3 of the XFP MSA standard details the control of the loopback modes.

The invention claimed is:

1. A single chip integrated circuit for use in an optical transceiver for converting and coupling an information containing electrical signal with an optical fiber, comprising:
an XFI interface for exchanging data with an information system device;
an XAUI interface for exchanging data with a laser transmitter subassembly including first, second, third and fourth lasers operating at different wavelengths and modulated by a respective one of four lane XAUI signals and a receiver subassembly;
an encoder for encoding an incoming XFI serial signal from the information system device into four lane XAUI format for transmission by the laser transmitter subassembly;
a decoder coupled to said XAUI interface for receiving said four lane XAUI signals from said receiver subassembly, converting said four lane XAUI signals into a serial XFI signal and applying said serial XFI signal to the XFI interface for transmission to the information system device, wherein the XFI interface, the XAUI interface, the encoder and the decoder are included in the single chip integrated circuit;
lane synchronization and alignment circuits for each of the four lane XAUI signals coupled to the XAUI interface;
an 8B/10B decoder coupled to said lane synchronization and alignment circuits to produce unencoded received data;
a 64B/66B encoder for receiving unencoded received data and encoding it into a 64B/66B serial data stream; and
a first clock and data recovery circuit having an input coupled to the output of the 64B/66B encoder and an output coupled to the XFI interface.

2. A circuit as defined in claim 1, further comprising a 64B/66B encoder for receiving unencoded received data and encoding it into a 64B/66B serial data stream.

3. A circuit as defined in claim 1, further comprising a power down interface for placing the single chip integrated circuit in a low power mode with all functionality except the (I²C) interface disabled.

4. A circuit as defined in claim 1, further comprising an inter-integrated circuit (I²C) interface for interfacing with the information system device as a slave.

5. A circuit as defined in claim 1, further comprising a FIFO coupled between the decoder and the encoder.

6. A circuit as defined in claim 1, further comprising an XFI equalizer.

7. A circuit as defined in claim 6, further comprising a second clock and data recovery circuit having an input connected to the XFI equalizer and an output coupled to the 64B/66B encoder.

8. A circuit as defined in claim 1, further comprising a Digital Optical Monitoring (DOM) circuit and a plurality of DOM registers.

9. A circuit as defined in claim 1, further comprising an output pin for indicating the single chip integrated circuit has detected a condition that renders data invalid.

10. A circuit as defined in claim 1, further comprising an output pin for indicating an operational fault or a status critical to the information system device.

11. A circuit as defined in claim 1, further comprising an output pin for indicating insufficient optical power for reliable signal reception.

* * * * *